Knowles

[11] Patent Number: 4,805,400
[45] Date of Patent: Feb. 21, 1989

United States Patent [19]

[54] NON-EROSIVE ARCJET STARTING CONTROL SYSTEM AND METHOD

[75] Inventor: Steven C. Knowles, Seattle, Wash.

[73] Assignee: Olin Corporation, Stamford, Conn.

[21] Appl. No.: 42,994

[22] Filed: Apr. 27, 1987

[51] Int. Cl.$^4$ .............................................. F03H 1/00
[52] U.S. Cl. .................................... 60/203.1; 60/204; 219/121.57
[58] Field of Search ....................... 60/203.1, 204, 202; 313/231.41; 219/121.55, 121.57

[56] References Cited

U.S. PATENT DOCUMENTS 4,577,461 3/1986 Cann ................................... 60/203.1

FOREIGN PATENT DOCUMENTS 67789 4/1985 Japan .................................. 60/203.1

OTHER PUBLICATIONS

John et al, "Arcjet Engine Performance: Experiment & Theory", AIAA Journal, vol. 1, No. 11, Nov. 1963, pp. 2517-2525.

Primary Examiner—Donald E. Stout
Attorney, Agent, or Firm—Bruce E. Burdick

[57] ABSTRACT

A non-erosive arcjet starting control system and method are provided in combination with an arcjet thruster which includes an anode, a cathode and a gap defined therebetween. The starting control system and method include the operative steps of, first, actuating a valve in a propellant gas feed path to an opened position thereby permitting flow of propellant gas at a predetermined pressure into the thruster past the gap therein, second, applying to the anode and cathode an electrical potential of a predetermined magnitude being less than that required to generate an electrical arc across the gap through propellant gas at the predetermined flow pressure and, concurrently, actuating the valve to its closed position thereby preventing flow of propellant gas into the thruster past the gap and thereby lowering the flow pressure of the propellant gas in the thruster below the predetermined pressure such that an electrical arc is now generated in the thruster across the gap and, finally, actuating the valve to its opened position thereby permitting propellant gas to flow again at the predetermined pressure into the thruster past the gap and force the electrical arc to move downstream within the thruster so as to minimize erosion in the constrictor. The flow of propellant into the thruster is prevented for only a short period of time.

12 Claims, 2 Drawing Sheets

NON-EROSIVE ARCJET STARTING CONTROL SYSTEM AND METHOD

CROSS REFERENCE TO RELATED APPLICATION

Reference is hereby made to the following copending U.S. patent application dealing with related subject matter and assigned to the assignee of the present invention: "Improved Efficiency Arcjet Thruster with Controlled Arc Startup and Steady State Attachment" by Steven C. Knowles and William W. Smith, assigned U.S. Ser. No. 889,451 and filed July 23, 1986, now allowed.

BACKGROUND OF THE INVENTION

"The invention described herein was made in the performance of work under NASA Contract No. NAS 3-24631 and is subject to the provisions of Section 305 of the National Aeronautics and Space Act of 1958 (72 Stat. 435; 42 U.S.C. 2457). However, the Government (NASA) has waived its patent rights in Waiver Case No. AW-2548."

1. Field of the Invention

The present invention generally relates to small propulsion systems for maneuvering spacecraft and, more particularly, is concerned with an arcjet thruster employing a starting control system and method for achieving a non-erosive arc initiation.

2. Description of the Prior Art

As conventionally known, an arcjet thruster converts electrical energy to thermal energy by heat transfer from an arc discharge to a flowing propellant and from thermal energy to directed kinetic energy by expansion of the heated propellant through a nozzle. For an explanation from a historical perspective of arcjet thruster construction and operation and the problems associated with this type of electrothermal propulsion, attention is directed to the following publications: "Arcjet Thruster for Space Propulsion" by L. E. Wallner and J. Czika, Jr., NASA Tech Note D-2868, June 1965; "The Arc Heated Thermal Jet Engine" by F. G. Penzig, AD 671501, Holloman Air Force Base, March 1966; and "Physics of Electric Propulsion" by R. G. Jahn, McGraw-Hill Book Company, 1968. Attention is also directed to U.S. Pat. No. 4,548,033 to G. L. Cann.

Most arcjet thrusters have as common features an anode in the form of a nozzle body and a cathode in the form of a cylindrical rod with a conical tip. The nozzle body has an arc chamber defined by a constrictor in a upstream portion of the body and a nozzle in a downstream portion thereof. The cathode rod is aligned on the longitudinal axis of the nozzle body with its conical tip extending into the upstream end of the arc chamber in spaced relation to the constrictor so as to defined a gap therebetween.

Although arcjet thrusters of this general configuration have been developed since the early 1960's, they have suffered extreme difficulty in starting and have associated therewith very high erosion rates on startup. Erosion of the nozzle body anode is due to initial movement of the foot of the arc across the gap and downstream along the constrictor of the nozzle body. Since flight applications of arcjet thrusters requires re-starting hundreds of times, erosions at starting can easily decrease the number of cycles that can be expected from the thruster.

Heretofore, starting the arcjet thruster has been accomplished by several different methods. In one method, a very high D.C. voltage is applied to the anode and cathode electrodes. In another approach, a high frequency A.C. voltage signal is used to initiate the arc. In still another method, a secondary electrode is used to initiate a small initial arc that then induces the main arc. However, none of these methods have been particularly successful since the flow of propellant gas is not controlled in such a way as to minimize anode erosion.

Consequently, a need exists for a fresh approach to arcjet thruster starting which will take into consideration all of the factors causing anode erosion at startup.

SUMMARY OF THE INVENTION

The present invention provides a non-erosive arcjet starting control system and method designed to satisfy the aforementioned needs. Underlying the starting control system and method of the present invention is the recognition that the degree of erosion of the anode nozzle body is at least partially determined by the method used to control the initial combination of electrode potential across the gap and the propellant gas pressure in the arc chamber. In the present invention, the degree of erosion is reduced during starting of an arcjet thruster by sending a low pressure pulse of gas through the arc chamber of the thruster, that is generated by accurate control of a solenoid valve in the propellant line, and concurrently applying a steady electrode voltage potential across the gap between the cathode and the anode.

Accordingly, the present invention is directed to a non-erosive arcjet starting control system in combination with an arcjet thruster having an anode, a cathode and a gap defined therebetween. The starting control system of initiating a substantially non-erosive arc across the gap comprises: (a) propellant supply means defining a feed path for supplying propellant at a predetermined flow pressure into the thruster past the gap therein; (b) power control means operable for applying to the anode and cathode an electrical potential of a predetermined magnitude being less than that required to generate an electrical arc in the thruster across the gap through propellant at the predetermined flow pressure; (c) valve means interposed in the feed path of the propellant supply means and being actuatable between opened and closed positions for respectively permitting and preventing flow of propellant into the thruster past the gap therein; and (d) valve driver means electrically coupled to the valve means and operable to actuate the valve means between its opened and closed positions such that a substantially non-erosive arc can be initiated within the thruster across the gap therein. In particular, the valve means is a solenoid-actuated valve.

Also, the present invention is directed to a non-erosive starting control method in combination with the arcjet thruster wherein the method comprises the steps of: (a) permitting propellant at a predetermined pressure to flow into the thruster past the gap therein; (b) applying to the anode and cathode of the thruster an electrical potential of a predetermined magnitude being less than that required to generate an electrical arc across the gap through the propellant at the predetermined flow pressure; (c) preventing flow of propellant into the thruster past the gap and thereby lowering the flow pressure of the propellant in the thruster below the predetermined pressure such that an electrical arc is now generated in the thruster across the gap; and (d) permitting propellant to flow again at the predetermined pressure into the thruster past the gap and force the electrical gap to move downstream so as to minimize erosion in the thruster.

More particularly, in steps (a) and (d) the flow of propellant at the predetermined pressure into the thruster past the gap is permitted by actuating the valve in the propellant feed path to an opened position. Further, in step (c) the flow of propellant at the predetermined pressure into thruster past the gap is prevented by actuating the valve in the propellant feed path to a closed position but only for a short period of time. Also, steps (b) and (c) are performed substantially concurrently.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
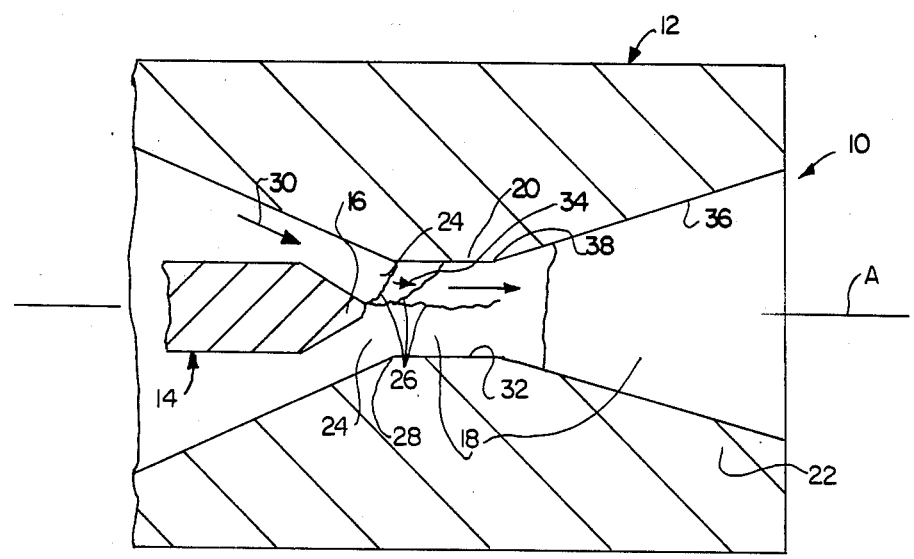
FIG. 1 is a schematical axial sectional view of the cathode rod and anode nozzle body of a typical arcjet thruster.

Referring now to the drawings, and particularly to FIG. 1, there is shown a typical arcjet thruster, generally indicated by the numeral 10. As conventionally known, the arcjet thruster 10 basically includes an anode 12 in the form of a nozzle body and a cathode 14 in the form of an elongated cylindrical rod with a conical tip 16. The anode body 12 has an arc chamber 18 defined by a constrictor 20 in a rearward portion of the body and a nozzle 22 in a forward portion thereof. The cathode rod 14 is aligned on the longitudinal axis A of the anode body 12 with its tip 16 extending into the upstream end of the arc chamber 18 in spaced relation to the constrictor 20 so as to defined a gap 24 therebetween.

An electrical potential is established between the anode body 12 and cathode rod 14 in a known manner to initiate generation of an arc 26 across the gap 24. The arc 26 is first initiated between the top 16 of the cathode rod 14 and the closest point 28 on the anode body 12 at the entrance to the constrictor 20. As represented by the arrow 30 and successive positions of the arc depicted in FIG. 1, the arc 26 is forced downstream along the surface 32 of the constrictor 20 by pressurized flow of a propellant gas, as represented by the arrow 34, through and past the gap 24, through the constrictor 20 and out the nozzle 22 of the thruster 10. The arc 26 stabilizes at the surface 36 of the nozzle 22 of the anode body 12. The transition period when the arc 26 moves from the entrance point 28 on the constrictor 20 to an exit point 38 thereon can cause life limiting material erosion because of localized surface heating at the arc attachment points.

Figure 2:
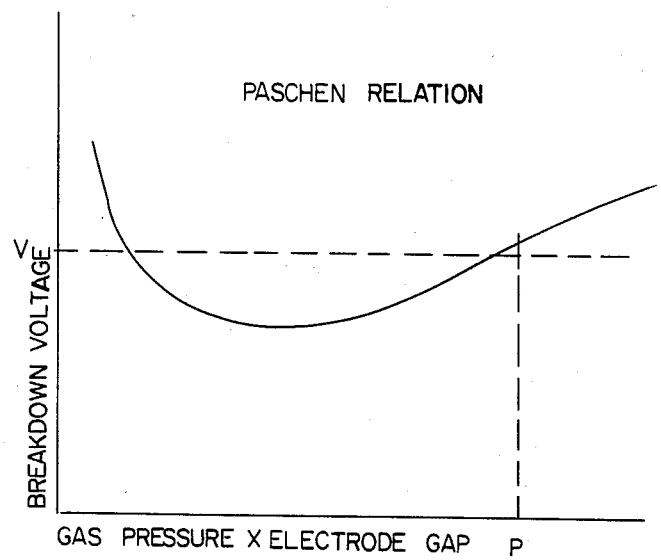
FIG. 2 is a graph of a typical Paschen relation between sparking potential or breakdown voltage across an electrode gap and the product of the gap and gas pressure.

It will be seen from review of a typical Paschen relation depicted in the graph of FIG. 2 that to start the arcjet thruster 10, the proper combination of magnitudes of electrode voltage potential and propellant gas flow pressure must be established therein to induce a voltage breakdown and initiation of the arc 26 for a given size of the gap 24 between the anode 12 and cathode 12 of the thruster 10. In other words, for a fixed product (P) of electrode gap and gas pressure, there is a corresponding breakdown potential (V).

For the conventional arcjet thruster 10, a breakdown voltage in excess of 1200 volts D.C. is required at typical electrode gaps and steady state flow gas pressures. However, this magnitude of voltage may be prohibitive from spacecraft integration and arjet power control unit standpoints. Anode erosion can be reduced by minimizing the time the arc 26 spends transitioning from entrance point 28 to exit point 38 on the constrictor 20. Ideally, this would occur by starting with the maximum gas dynamic forces produced by steady state flow conditions. However, the high voltage limitations discussed above may prohibit this.

Figure 3:
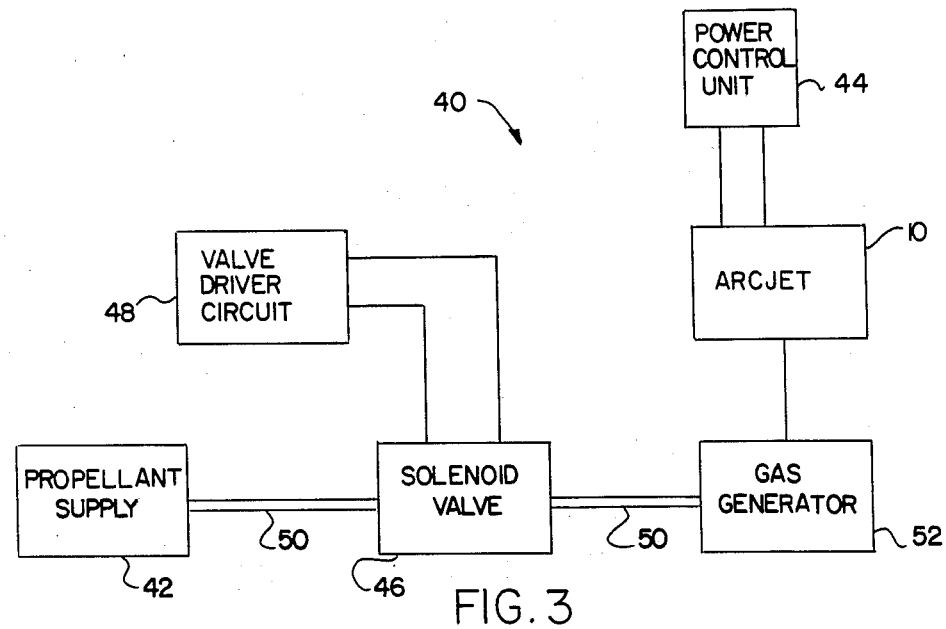
FIG. 3 is a block diagram of the non-erosive arcjet thruster starting control system of the present invention.

In accordance with the principles of the present invention, a technique has now been developed whereby valve means is used to effect a non-erosive start by modulating the gas pressure. In particular, the valve means is pulsed off to lower the gas pressure momentarily, resulting in the need for a lower breakdown potential and yet still keeping the arc transition time low to minimize anode erosion. The technique, briefly mentioned above, has been implemented in a non-erosive arcjet starting control system, generally designated by the numeral 40 and schematically shown in block diagram form in FIG. 3. The basic components of the starting control system 40 are represented in block form since they are individually well known in the art, and to reproduce them in detail would only serve to increase the complexity of the explanation of the system utilized in controlling starting of the arcjet 10 without adding to its clarity.

In its basic components, the starting control system 40 includes a propellant supply 42, a power control unit 44, valve means preferable in the form of a solenoid-actuated valve 46, and valve driver circuit 48. A supply conduit 50 connects to the propellant supply 42 and defines a feed path for supplying propellant under pressure into the thruster 10 where it flows past the gap 24 and through the constrictor 20 at the upstream end of the arc chamber 18. In the case of a monopropellant arcjet thruster which utilizes hyrazine for example, a catalytic gas generator 52 is interposed in the feed path via connection in the supply conduit 50 between the propellant supply 42 and the thruster 10. Thus, liquid propellant first passes into the gas generator 52 where it is decomposed in a known manner into a high-temperature gas. The solenoid-actuated valve 46 is also interposed in the feed path by connection in the supply conduit 50 upstream of the gas generator 52 and downstream of the propellent supply 42.

More particularly, the power control unit 44 is operable in a known manner to apply to the anode 12 and cathode 14 of the thruster 10 an electrical voltage potential of a desired predetermined magnitude. In the context of the present invention, the predetermined magnitude is less than that required to generate the electrical arc 26 in the arc chamber 18 across the gap 24 at the predetermined magnitude of the flow pressure of the propellant gas from the supply 42 via the gas generator 52. The solenoid-actuated valve 46 is actuatable between opened and closed positions for respectively permitting and preventing flow of propellant into the arc chamber 18 of the thruster 10 by operation of the valve drive circuit 48 electrically coupled to the valve 46.

By coordinated operation of the above-described components of the starting control system 40, a substantially non-erosive arc 26 can be initiated across the gap 24 in the thruster 10. First, the valve driver circuit 48 is operated to actuate the solenoid valve 46 to its opened position thereby permitting propellant gas at the predetermined pressure to flow into the arc chamber 18. Next, the power control unit 44 is operated to apply to the anode 12 and cathode 14 of the thruster 10 an electrical voltage potential of a predetermined magnitude, for example a moderate voltage potential of 600 volts D.C., being less than that required to generate an electrical arc across the gap through propellant gas at the predetermined flow pressure of approx. 20 psia. Simultaneously as the moderate voltage potential is applied, the valve driver circuit 48 is now operated to actuate the solenoid valve 46 to its closed position thereby preventing flow of propellant gas into the arc chamber 18 of the thruster 10. The flow of propellant gas into the thruster 10 is prevented for only a short period of time, for instance for a period of from ten to 150 msec. Such blockage of gas flow causes lowering of the flow pressure of the propellant gas in the thruster arc chamber 18 sufficiently below the predetermined pressure to facilitate generation of the electrical arc 26 in the thruster arc chamber 18 across the gap 24. Once the arc 26 is initiated, the valve driver circuit 48 is then operated to actuate the solenoid valve 46 back to its opened position thereby permitting propellant gas to flow once again at the desired predetermined pressure into the thruster arc chamber and thereby force the initiated electrical arc 26 to move downstream through the constrictor 20 to the nozzle 22 of the anode body 12 so as to minimize erosion in the constrictor.

Figure 4:
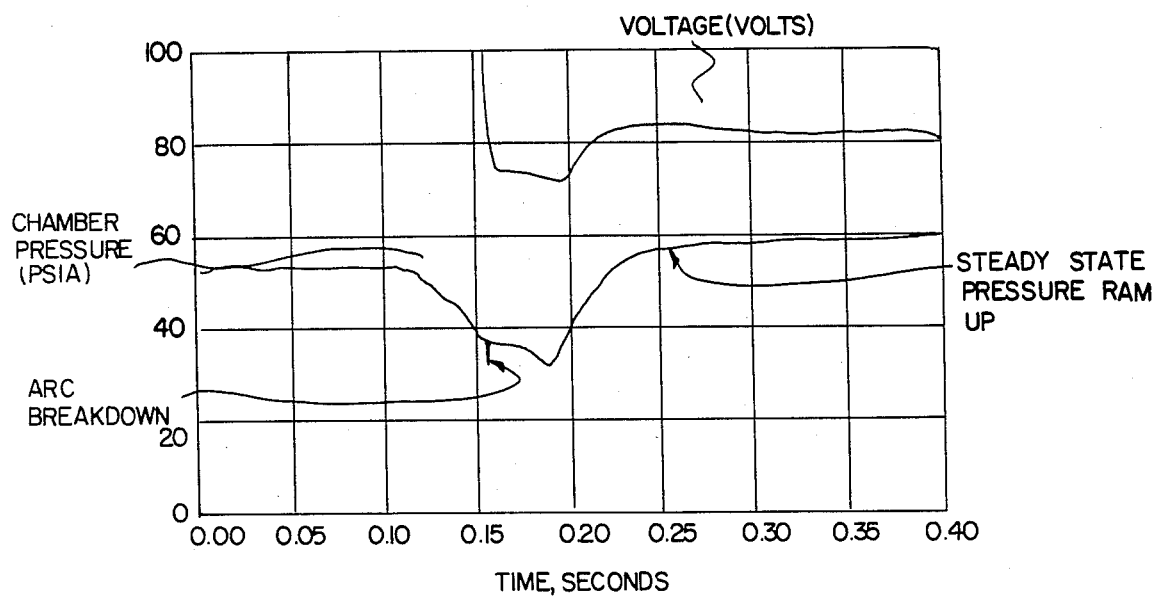
FIG. 4 is a graph depicting the timing relationship between application of a steady electrode potential and pulsing of the arc chamber gas flow pressure which is used by the arcjet starting system and method of the present invention to achieve a non-erosive arc initiation.

FIG. 4 depicts the timing relationship between application of the moderate steady electrode potential by the power control unit 44 and the pulsing of the arc chamber gas flow pressure which is employed by system 10 to achieve non-erosive arc initiation.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. In combination with an arcjet thruster including an anode, a cathode and a gap defined therebetween, a starting control system for initiating a substantially non-erosive arc across said gap comprising:

(a) propellant supply means defining a feed path for supplying propellant at a predetermined flow pressure into said thruster past said gap therein;
   (b) power control means operable for supplying to said anode and cathode an electrical potential of a predetermined magnitude being less than that required to generate an electrical arc in said thruster across said gap through propellant at the predetermined flow pressure;
   (c) valve means interposed in said feed path of said propellant supply means and being actuatable to switch between opened and closed positions for respectively permitting and preventing flow of propellant at said predetermined flow pressure into said thruster past said gas therein; and
   (d) valve driver means electrically coupled to said valve means and being operable to actuate said valve means to switch it between its opened and closed positions, said valve driver means being further operable, concurrently with application of said electrical potential by said power control means for initiation of said electric arc generation and after actuation of said valve means to switch it to its opened position, to again actuate said valve means in order to switch it during only a momentary period of time from its opened position to its closed position and then back to its opened position for causing transmission of a pulse of propellant gas, being at a flow pressure below said predetermined flow pressure, into said thruster and past said gap such that a substantially non-erosive arc can be initiated within said thruster across said gap and then forced to move downstream within the thruster so as to minimize erosion therein.

2. The starting control system as recited in claim 1, wherein said valve means is a solenoid-actuated valve.

3. The starting control system as recited in claim 1, wherein said momentary period of time is within the range of from ten to 150 msec.

4. In combination with an arcjet thruster including an anode in the form of a nozzle body and a cathode in the form of a rod with a tip, said body having an arc chamber defined by a constrictor in an upstream portion of said body and a nozzle in a downstream portion thereof, said cathode rod being aligned on the axis of said body with its tip extending into the upstream end of said arc chamber in spaced relation to said contrictor so as to define a gap therebetween, a starting control system for initiating a substantially non-erosive arc across said gap comprising:

(a) propellant supply means defining a feed path for supplying propellant gas at a predetermined flow pressure into said thruster past said gap therein and through said constrictor at said upstream end of said arc chamber;
   (b) power control means operable for applying to said anode and cathode an electrical potential of a predetermined magnitude being less than that required to generate an electrical arc in said arc chamber across said gap through propellant at said predetermined flow pressure;
   (c) valve means interposed in said feed path of said propellant supply means and being actuatable to switch between opened and closed positions for respectively permitting and preventing flow of propellant into said thruster past said gap therein; and (d) valve driver means electrically coupled to said valve means and being operable to actuate said valve means to switch it between its opened and closed positions, said valve driver means being further operable, concurrently with application of said electrical potential by said power control means for initiation of said electric arc generation and after actuation of said valve means to switch it to its opened position, to again actuate said valve means in order to switch it during only a momentary period of time from its opened position to its closed position and then back to its opened position for causing transmission of a pulse of propellant gas, being at a flow pressure below said predetermined flow pressure, into said thruster and past said gap such that a substantially non-erosive arc can be initiated within said thruster across said gap and then forced to move downstream through said constrictor to said nozzle so as to minize erosion in said contrictor.

5. The starting control system as recited in claim 4, wherein said valve means is a solenoid-actuated valve.

6. The starting control system as recited in claim 4, wherein said momentary period of time is within the range of from ten to 150 msec.

7. In combination with an arcjet thruster including an anode, a cathode and a gap defined therebetween, a starting control method for initiating a substantially non-erosion arc across said gap comprising the steps of:
  (a) permitting flow of propellant at a predetermined pressure into the thruster past the gap;
  (b) applying to the anode and cathode an electrical potential of a predetermined magnitude being less than required to generate an electrical arc across the gap through the propellant at the predetermined flow pressure;
  (c) concurrently with applying of the electrical potential for initiation of electrical arc generation and after permitting of propellant flow at the predetermined pressure, preventing flow of propellant to the thruster past the gap during only a momentary period of time for causing transmission of a pulse of propellant, being at a flow pressure below the predetermined pressure, into the thurster and past the gap such that a non-erosive arc can be initiated in the thruster across the gap; and
  (d) after passage of the momentary period of time, permitting propellant at the predetermined pressure to flow again into the thruster past the gap and force the non-erosive arc to move downstream so as to minimize erosion in the thruster.

8. The starting control method as recited in claim 7, wherein said flow of propellant at the predetermined pressure into the thruster past the gap is permitted by actuating a valve in a propellant feed path to switch it to an opened position.

9. The starting control method as recited in claim 7, wherein said flow of propellant into the thruster past the gap is prevented by actuating a valve in a propellant feed path to switch it to a closed position.

10. The starting control method as recited in claim 7, wherein said momentary period of time during which said flow of propellant into the thruster past the gap is prevented is within the range of ten to 150 msec.

11. In combination with an arcjet thruster including an anode in the form of a nozzle body and a cathode in the form of a rod with a tip, said body having an arc chamber defined by a constrictor in an upstream portion of said body and a nozzle in a downstream portion thereof, said cathode rod being aligned on the axis of said body with its tip extending into the upstream end of said arc chamber in spaced relation to said constrictor so as to define a gap therebetween, a starting control method for initiating a substantially non-erosive arc across said gap comprising the steps of:
  (a) actuating a valve in a propellant gas feed path to switch it to an opened position thereby permitting flow of propellant gas at a predetermined pressure into the arc chamber past the gap;
  (b) applying to the anode and cathode an electrical potential of a predetermined magnitude being less than that required to generate an electrical arc across the gap through propellant gas at the predetermined flow pressure;
  (c) concurrently with applying of the electrical potential for initiation of electrical arc generation and after actuating the valve to switch it to the opened position, permitting propellant flow at the predetermined pressure, actuating the valve to switch it to its closed position thereby preventing flow of propellant into the arc chamber past the gap during only a momentary period of time for causing transmission of a pulse of propellant, being at a flow pressure below the predetermined pressure, into the arc chamber and past the gap such that a non-erosive arc can be initiated in the arc chamber across the gap; and
  (d) after passaage of the momentary period of time, actuating the valve to switch it to its opened position thereby permitting propellant gas to flow again at the predetermined pressure into the arc chamber past the gap and force the non-erosive arc to move downstream through the constrictor to the nozzle so as to minimize erosion in the constrictor.

12. The starting control method as recited in claim 11, wherein said momentary period of time during which said flow of propellant into the thruster past the gap is prevented is within the range of ten to 150 msec.

* * * * *

UNITED STATES PATENT AND TRADEMARK OFFICE
CERTIFICATE OF CORRECTION

PATENT NO. : 4,805,400

DATED : February 21, 1989

INVENTOR(S) : Steven C. Knowles

It is certified that error appears in the above-identified patent and that said Letters Patent is hereby corrected as shown below:

In column 1, line 66, delete "erosions" and insert -- erosion --.

In column 3, line 4, delete "gap" and insert -- arc --.

In column 3, line 62, delete "top" and insert -- tip --.

Signed and Sealed this

Seventeenth Day of April, 1990

Attest:

HARRY F. MANBECK, JR.

*Attesting Officer*  *Commissioner of Patents and Trademarks*